(12) United States Patent
Cappuzzo et al.

(10) Patent No.: US 6,366,730 B1
(45) Date of Patent: Apr. 2, 2002

(54) TUNABLE OPTICAL WAVEGUIDES

(75) Inventors: Mark Anthony Cappuzzo, Succasunna; Christopher Richard Doerr, Middletown; John VanAtta Gates, New Providence; Louis T. Gomez, North Plainfield; Dirk Joachim Muehlner, Berkeley Heights, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/542,096

(22) Filed: Apr. 3, 2000

(51) Int. Cl.[7] .................................................. G02B 6/10
(52) U.S. Cl. ........................ 385/129; 385/131; 385/132; 385/147; 385/1; 216/24
(58) Field of Search ............................ 216/24; 385/147, 385/129, 131, 132, 14, 1

(56) References Cited

U.S. PATENT DOCUMENTS 4,970,713 A * 11/1990 Imoto
5,117,470 A * 5/1992 Inonue et al.
6,002,823 A * 12/1999 Chandross et al.
6,236,774 B1 * 5/2001 Lackritz et al.

* cited by examiner

*Primary Examiner*—Hung N. Ngo
(74) *Attorney, Agent, or Firm*—Peter V. D. Wilde; Thomas, Kayden, Horstemeyer & Risley LLP (57) ABSTRACT

The specification describes thermo-optically controlled waveguides where the thermo-optic control is a heater strip precisely aligned to the waveguide core by using the heater strip as an etch mask to define at least part of the core/upper cladding structure. In one embodiment the heater strip mask is larger than the underlying waveguide core so as to produce, on etching, a core surrounded with a minimum of cladding material on the sidewalls of the core, and a confined heat channel between the waveguide core and the heater strip. In a second embodiment the heater strip is used as an etch mask to define a core cladding stack, and a third cladding layer is deposited to clad the sidewalls of the core. In this embodiment, the cladding material in the stack can be optimized for thermal conductivity, and the third cladding material can be optimized for thermo-optic sensitivity.

17 Claims, 10 Drawing Sheets

TUNABLE OPTICAL WAVEGUIDES

FIELD OF THE INVENTION

This invention relates to optical waveguides tuned by thermo-optic control.

BACKGROUND OF THE INVENTION

The ability to effect localized changes in refractive index ($\eta$) in planar lightguide circuits (PLCs) is an adjustment tool that is useful in a variety of devices. For example, this mechanism can be used to tune the phase in Mach-Zehnder Interferometers (MZI). See e.g. B. Zheng and C. Zheng, "A study of directional coupler modulator with thermo-controlled coupling coefficient, Integrated Optoelectronics, Beijing, China: SPIE Vol. 2891, 1996, pp. 178–182. Directional couplers having a 50% power splitting ratio are needed in Mach-Zehnder Interferometers (MZI). Directional couplers where coupling ratios vary from zero to one are useful in Fourier filters and ring filters. Couplers are widely used in optical transmission systems.

In these applications, the refractive index in the device as fabricated must be very close to the design value so that the waveguide has the desired spectral response. An important evolution for silica based PLCs is toward more compact devices, which require a higher refractive index difference ($\Delta$) between the core and cladding. A disadvantage of using high ($\Delta$) is that fabrication variations in refractive index increase. In tunable couplers, normal fabrication tolerances cause variations in the coupling ratios of ±5% for 3 dB couplers in silica with low $\Delta$s ($\leq 0.7\%$). A method for actively tuning the refractive index in local regions of a planar waveguide after fabrication would be beneficial by: 1) increasing device yield, and 2) providing additional functionality by allowing the refractive index in a local region of the waveguide to be modulated.

For silica waveguides the most effective post-fabrication technique to actively tune the PLC is to use thermal heaters and rely on the thermal dependence of the refractive index ($d\eta/dT$). Heaters can be deposited on the surface of the waveguide and used to tune the refractive index. However, the refractive index of silica is relatively insensitive to temperature, thus requiring a substantial temperature change to effect the desired adjustment. This requires both higher power and longer heating times. This is especially the case where the device structure has high thermal inertia between the heater and the core of the waveguide, and where the heater and the waveguide are not well aligned. A $\eta$ tunable waveguide with more sensitive and more rapid thermal response would represent a significant advance in the art.

SUMMARY OF THE INVENTION

We have developed a device structure and fabrication technique for improving the thermal efficiency of tunable waveguide heaters, thereby yielding devices with improved tuning sensitivity and response. The technique involves forming the heater strip on the upper cladding of a dual clad planar waveguide, then using the heater as a mask for forming a heat channel between the heater and the waveguide core. In an alternative embodiment, the heater strip can also used to define the core itself.

BRIEF DESCRIPTION OF THE DRAWING

FIGS. 12 to 19 are schematic representations of an alternative sequence of fabrication steps for the manufacture of a self-aligned heater and core device.

DETAILED DESCRIPTION

Figure 1:
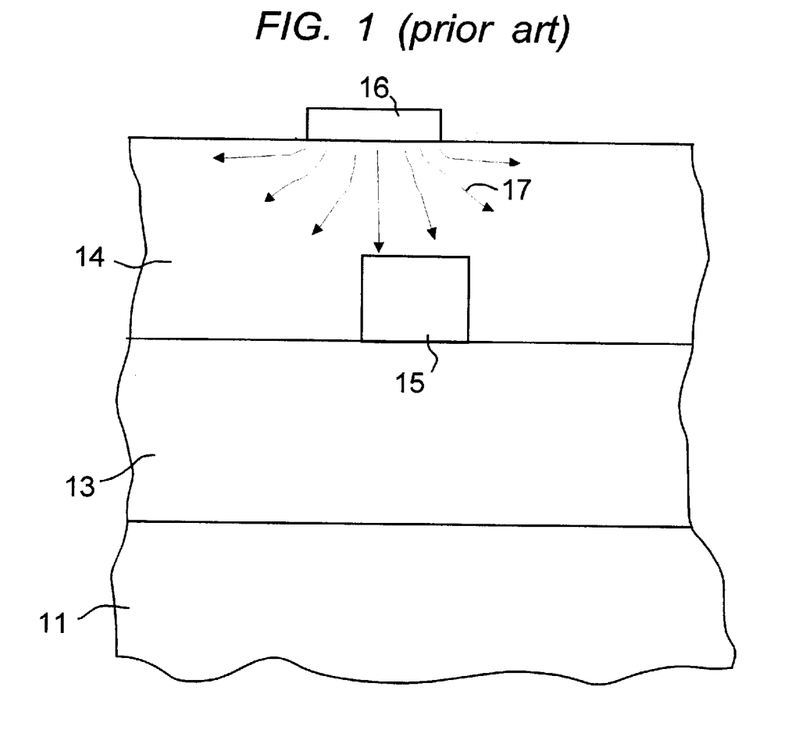
FIG. 1 is a sectional view of a portion of a PLC showing the basic structure of a conventional $\eta$ tunable waveguide.

With reference to FIG. 1, the substrate for the PLC is shown at 11. The substrate may be glass or other suitable rigid support. The preferred substrate material is silicon which is used in so-called optical bench technology for high quality optical integrated circuits. The technology for processing state of the art PLCs follows, in some respects, silicon IC wafer fabrication. The lower cladding layer of the waveguide is shown at 13 and the upper cladding layer at 14. The waveguide core is designated 15. In the conventional $\eta$ tunable waveguide the heater strip 16 is located on the surface of the upper cladding layer as shown. The heater strip comprises an electro-resistive material such as chrome, or nickel chrome. Electrodes, not shown in this view, are typically gold or copper contact pads at the ends of the strip wire, and are connected to a power source.

The heater strip is typically formed using a simple additive technique such as mask evaporation. The pattern of heat flow from the heater strip to the waveguide core is indicated schematically in the figure by flow lines 17. The heater and core are intentionally shown mis-aligned to represent a common defect in the conventional process. The resultant non-uniform heating of the waveguide core is evident. Severe misalignment can result in temperature gradients in the waveguide core which cause serious degradation in performance.

Figure 2:
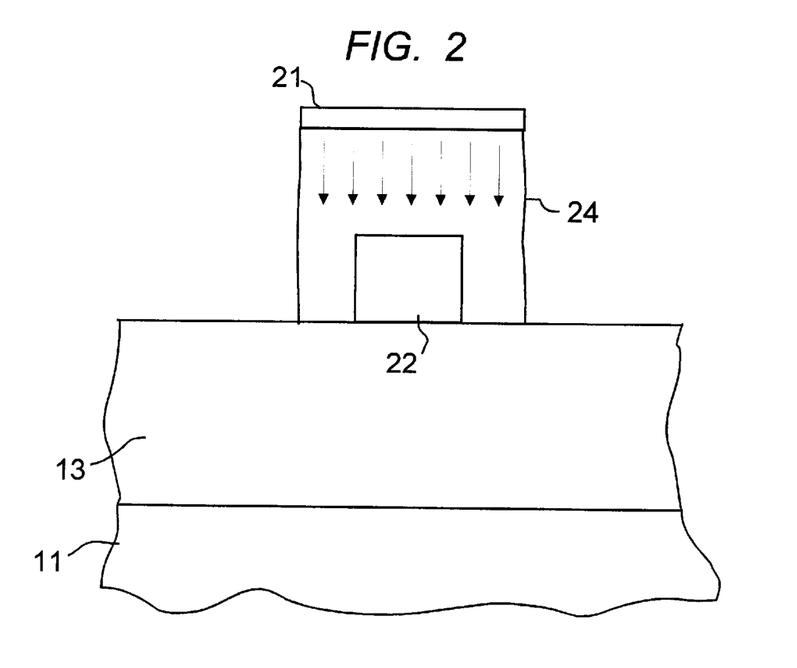
FIG. 2 is a sectional view similar to that of FIG. 1 showing a n tunable waveguide with the aligned heat channel of the invention.

A more efficient waveguide heating structure is shown in FIG. 2. Here the heating strip 21 is aligned over the waveguide core by blanket depositing the electro-resistive material and defining the heater strip using photolithography. The heater strip is then used as the alignment feature, i.e. part of the mask, to etch the upper cladding layer to form heat channel 24. The combination of alignment, and confinement of the heat flow pattern, as represented in FIG. 2, increases the efficiency of the heating mechanism, and the response and performance of the device.

A suitable process for making the device of FIG. 2, given by way of example and not intended as limiting the invention, is shown by the sequence of steps represented by FIGS. 3 to 11.

Figure 3:
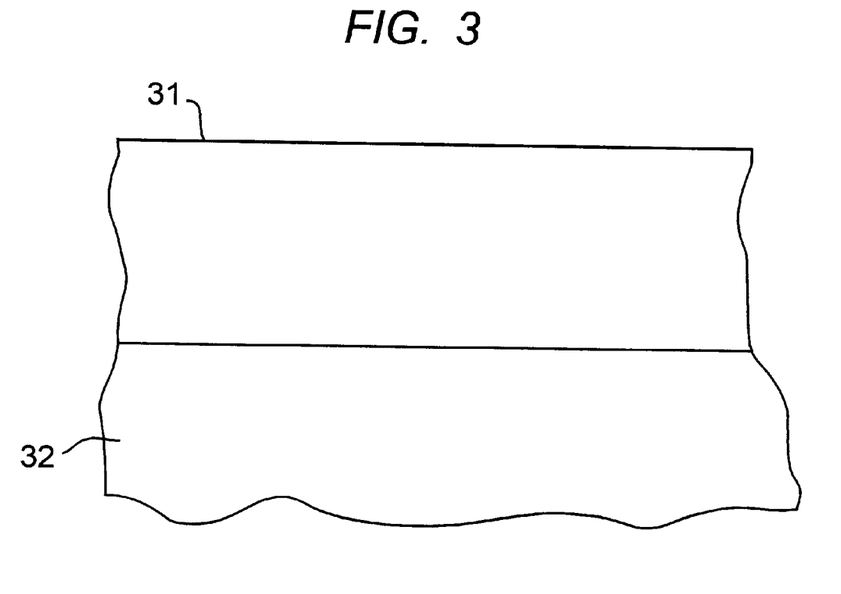
FIGS. 3 to 11 are schematic representations of a sequence of fabrication steps for the manufacture of the device of the invention.
Figure 4:
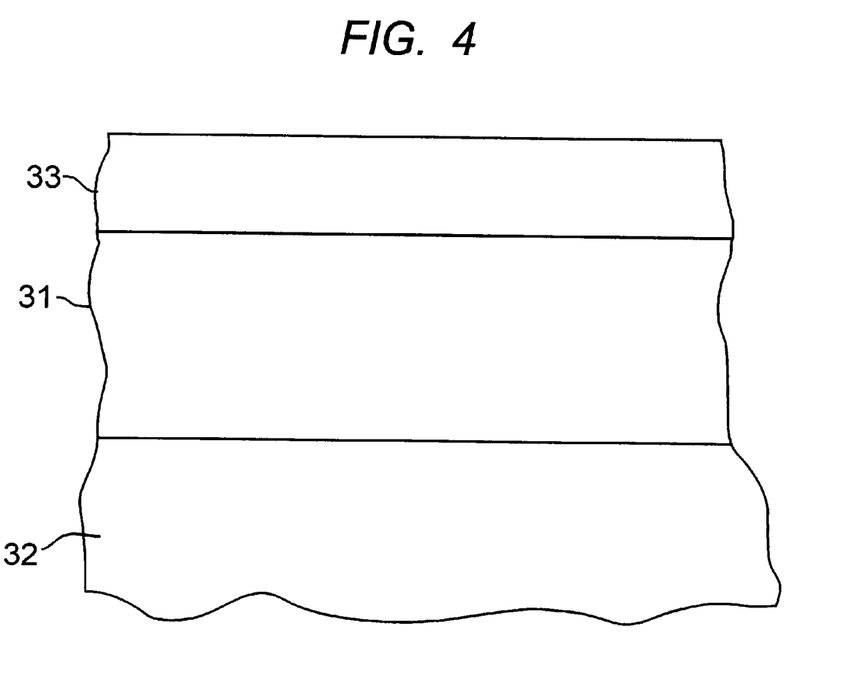

With reference to FIG. 3, a 15 $\mu$m oxide layer 31 is grown on a 5" silicon wafer 32 by high pressure oxidation to form the lower cladding layer for the waveguide. As shown in FIG. 4, the core layer 33 for the waveguide is deposited over lower cladding layer 31 by CVD deposition of doped $SiO_2$ using established CVD techniques. Typical CVD deposition processes use precursors of silane or halogenated silane and hydrogen, with hydrides or halides of phosphorus or germanium for the doping material. The level of doping is such as to create an index difference between core layer 33 and cladding layer 31 of 0.3–1.5%. The thickness of the core layer in this example is approximately 5 $\mu$m. The manufacture of waveguides for PLCs adopts many of the techniques used in optical fiber technology that are well known and widely used. The specifics of the glass technology form no part of the invention.

Figure 5:
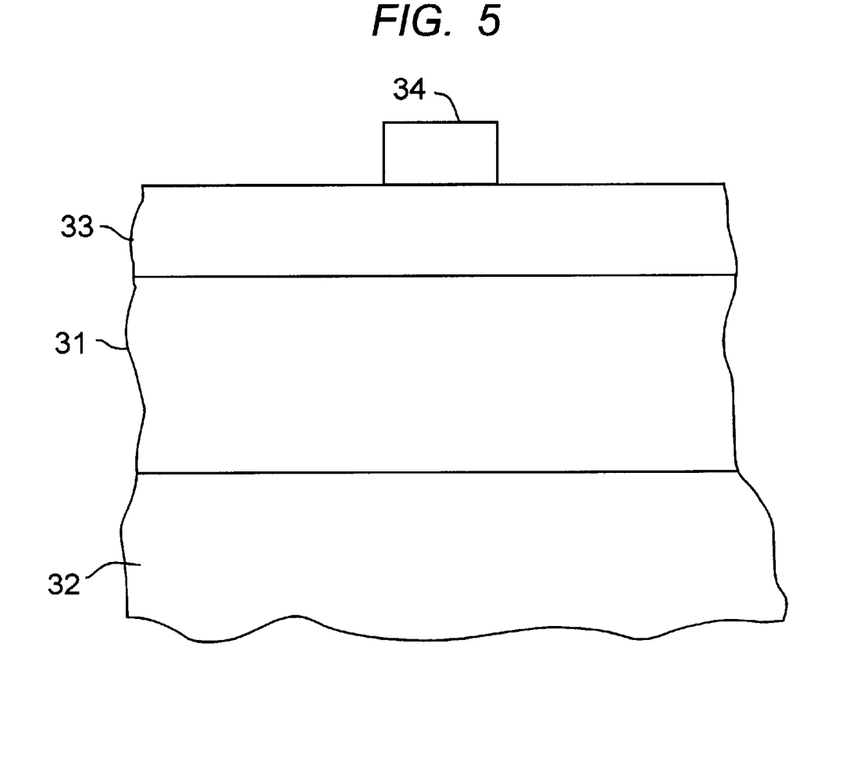
Figure 6:
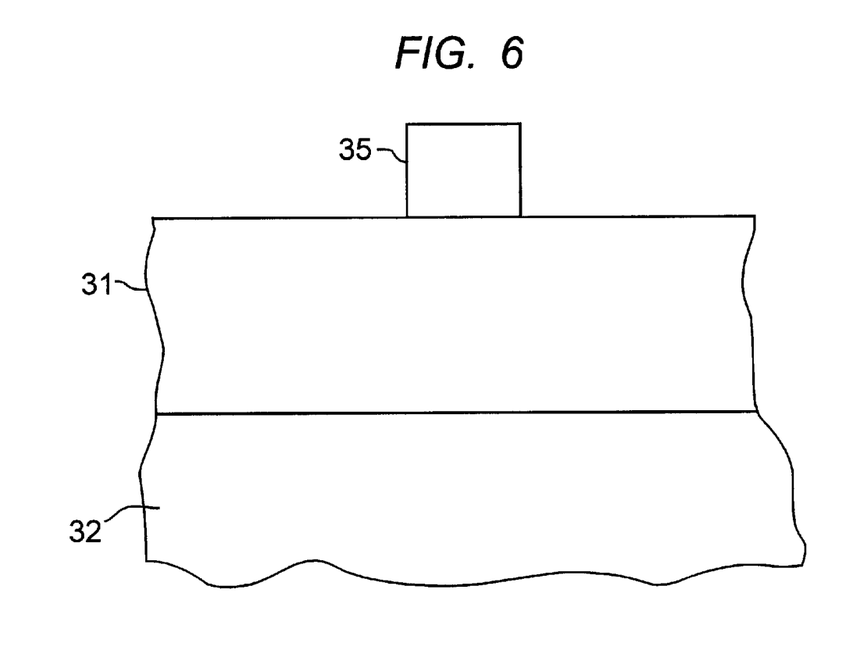

In the sequence of steps described here a single waveguide is shown for convenience. It will be recognized by those skilled in the art that at least two side-by-side waveguides are used in a typical coupling device. The waveguide is then defined by lithography. The feature sizes are relatively large, for example a 5 μm waveguide is typical. Consequently, photolithography is generally suitable, although other lithography methods, e.g. methods using electron beam or x-ray actinic radiation, may also be used. A lithographic mask layer is applied over cladding layer 33 and patterned as shown in FIG. 5 to produce mask feature 34 corresponding to the waveguide core. The core layer 33 is then etched, using mask 34, to produce the waveguide core. The structure after etching, and after removal of the mask 34, is shown in FIG. 6, with the waveguide core shown at 35. The etching technique is preferably Reactive Ion Etching (RIE) which will etch through a relatively thick silica layer without excessive undercut and produce relatively steep sidewalls. The sidewalls shown in these figures, which are not necessarily to scale, are shown vertical for simplicity.

Figure 7:
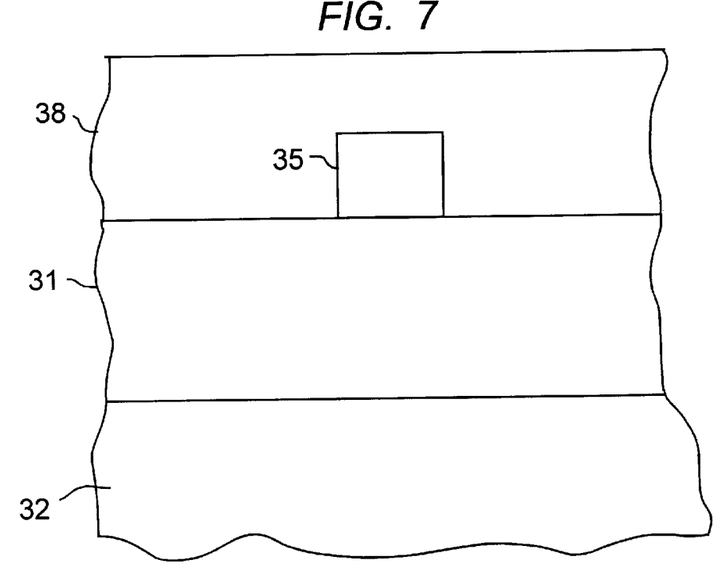

The upper cladding layer 38 is then deposited over the waveguide 35 as shown in FIG. 7. This layer may be, for example, BPTEOS (silica codoped with boron and phosphorus) having the same index as the lower cladding layer 31.

Figure 8:
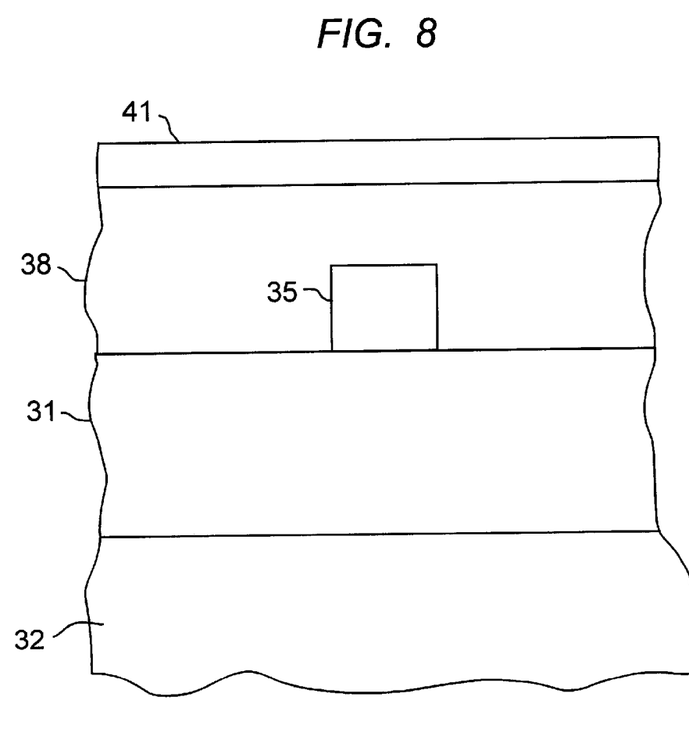
Figure 9:
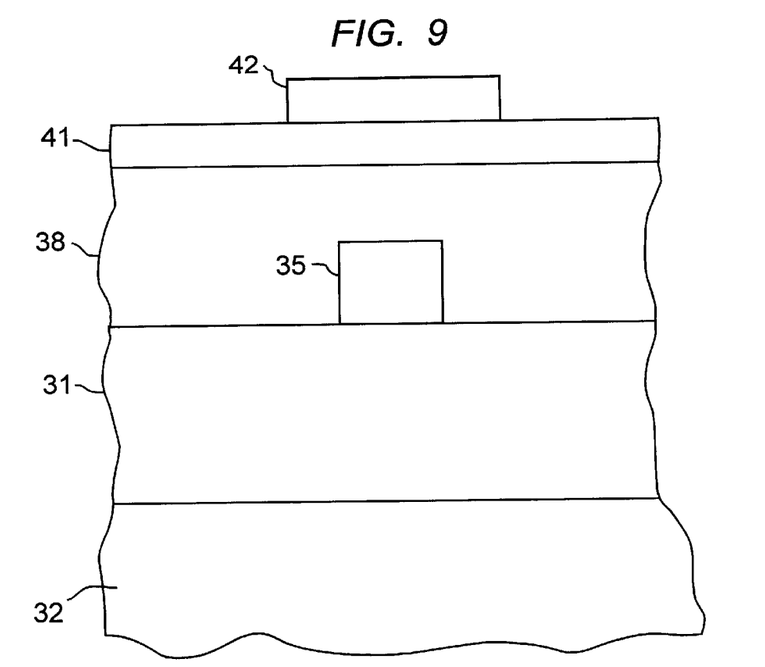
Figure 10:
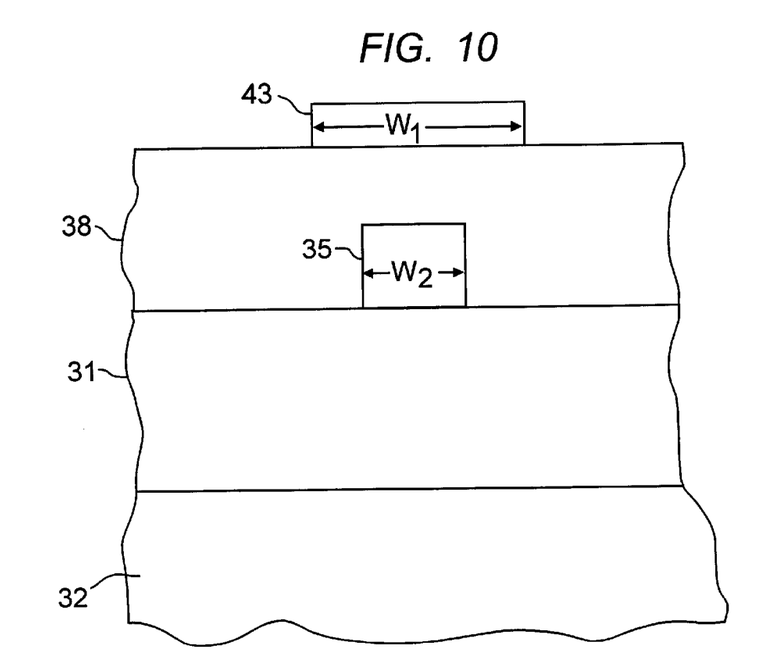

The heater strip is formed on the surface of the upper cladding layer by blanket depositing a thermo-electric material over the upper cladding layer 38 to form metal layer 41 as shown in FIG. 8. The metal layer is masked with photomask feature 42, shown in FIG. 9, and etched to produce heater strip 43 as shown in FIG. 10. Typically, in a conventional process, the heater strip is formed by evaporating or sputtering a layer of the resistive material and patterning the layer by a standard lift-off process, or by conventional lithographic masking and wet etching. However, in the preferred embodiment of the invention the heater strip is formed by photolithography to achieve precise alignment between the heater strip 43 and the waveguide core 35. Heat from the heater strip locally changes the refractive index of the upper cladding layer 38 and thus changes the optical containment of waveguide 35.

Gold electrode pads (not shown) may be provided at the ends of the strip heater using photolithography and wet etch or a lift-off technique.

An important feature of the process described in this embodiment is that the width $W_1$ of heater strip 43 should be substantially greater than the width $W_2$ of waveguide core 35. For effective waveguide function, $W_1$ should exceed $W_2$ by at least 6 μm, but for effective heat channeling should not exceed $W_2$ by more than 20 μm. Preferably $W_1$ is in the range 1.5 to 7 $W_2$.

Figure 11:
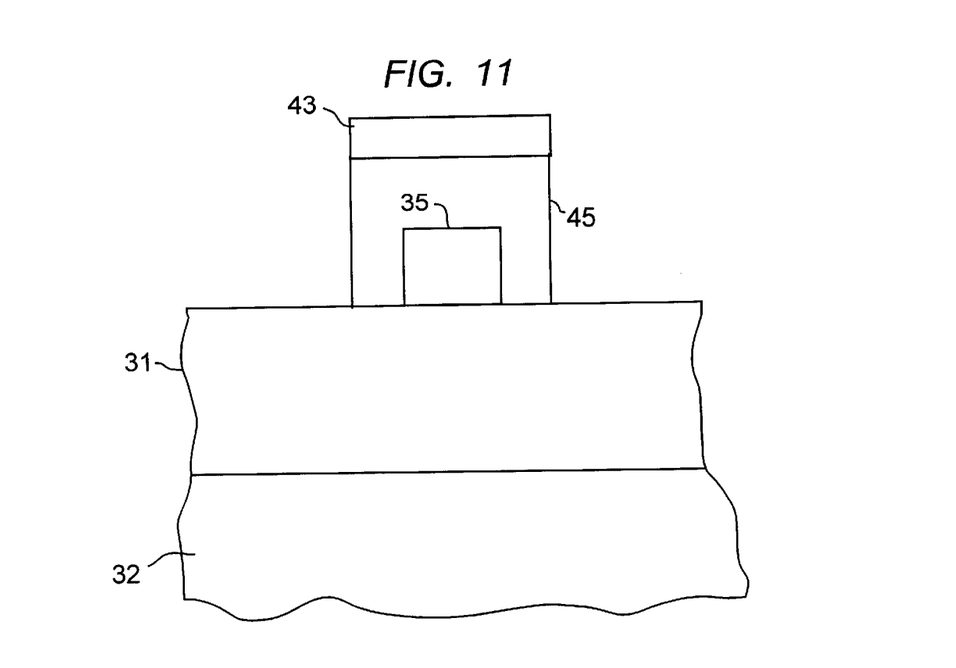

Using the heater strip 43 as part of the etch mask, the upper cladding layer is etched to form thermal channel 45 as shown in FIG. 11. Prior to the etch step, mask 42 may be removed or left in place as desired. Upper cladding layer 38 is preferably etched by RIE to produce relatively vertical sidewalls. The thermal channel 45 serves also as the top and sidewall cladding for waveguide core 35.

Heat from heater strip 43, change s the refractive index of the upper cladding layer 38 and thus changes the optical containment of waveguide 35.

Figure 12:
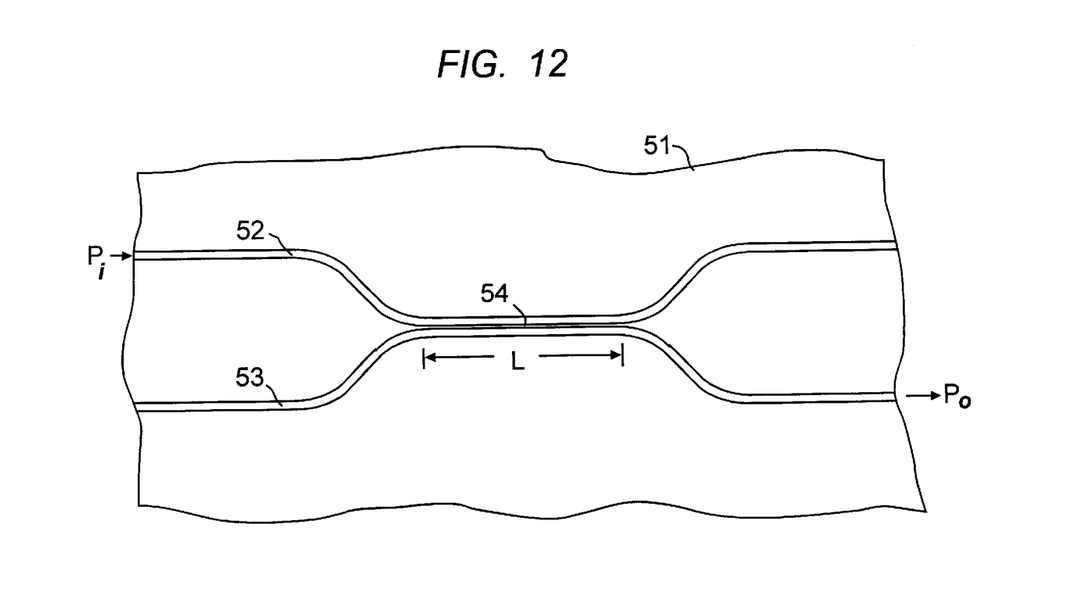
FIG. 12 is a schematic diagram of a directional coupler that may be fabricated using the principles of the invention.

Optical devices that use the thermoelectric control described here are well known. An example of such device is given by way of example and is illustrated in FIG. 12. With reference to FIG. 12, PLC substrate is shown at 51, with two waveguides shown at 52 and 53, with a coupling section where the waveguides run parallel and closely spaced to one another. The length of the coupling section is designated L. The coupling region, i.e. the space between the waveguides along the coupling section, is designated 54 in the figures. A heater strip (not shown) covers all or a substantial part of the coupling region.

The basic operation of a directional coupler is well known. It splits lightwaves coherently in a manner similar to a beam splitter in bulk optics. The input lightwave to waveguide 52 is $P_i$ and the output lightwave from waveguide 53 is $P_o$. When the waveguides are closely spaced, as in FIG. 12, the evanescent tail of the lightwave in waveguide 52 extends into waveguide 53 and induces an electric polarization. The polarization generates a lightwave in waveguide 53, which couples back to waveguide 52.

In the example given, the two waveguides are single mode and are parallel and identical in structure in the coupling region. Both waveguides bend away from each other at the ends as shown, and gradually decouple. The input lightwave $P_i$ and the output lightwave $P_o$ are related by:

$$P_i = k\, P_o$$

where k is the coupling ratio. The coupling ratio is strongly affected by the coupling region, and in particular by the core-to-cladding refractive index difference which is temperature dependent. As described earlier, this dependency can be utilized to adjust the refractive index after the fabrication of the waveguides has been completed.

Figure 13:
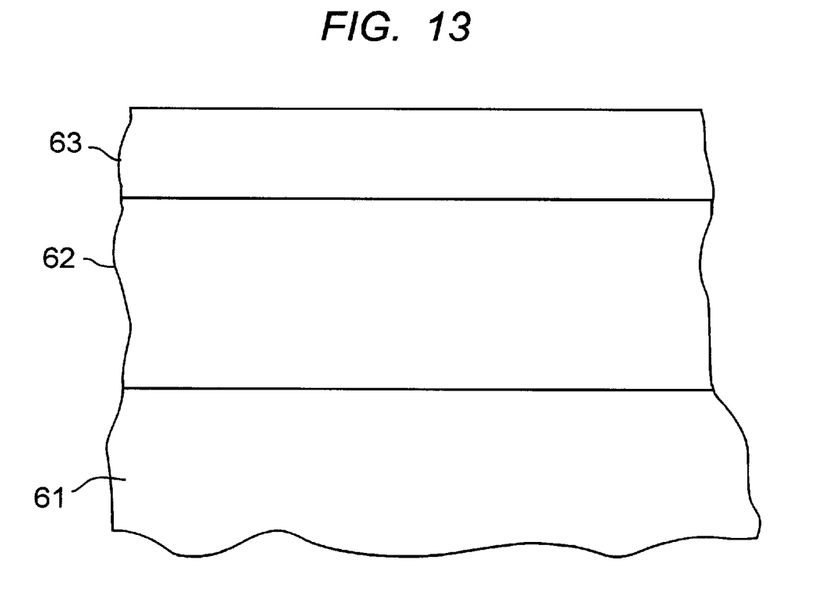
Figure 14:
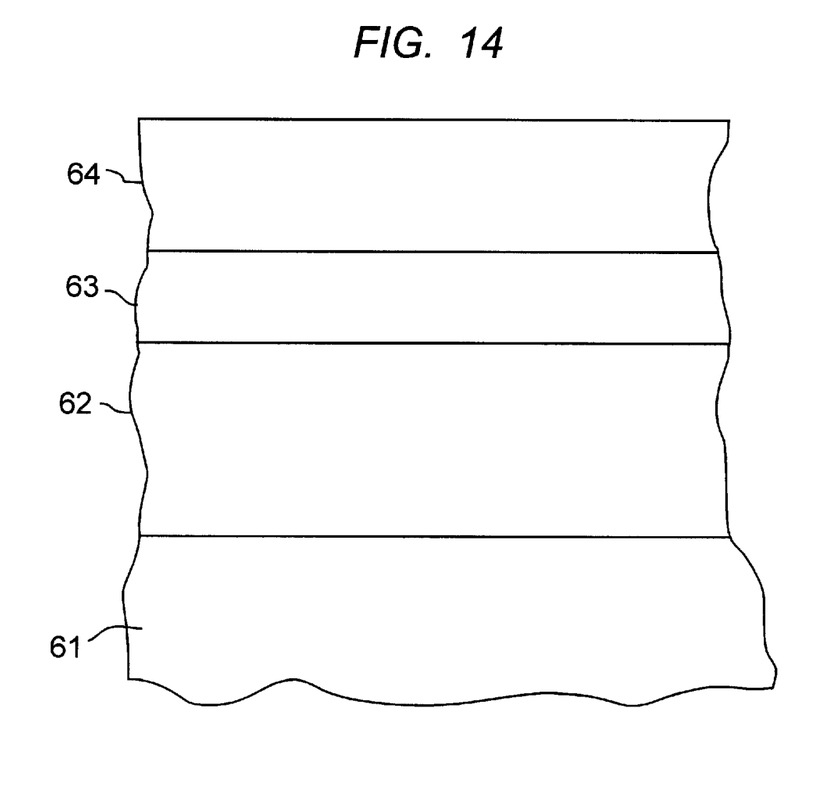
Figure 15:
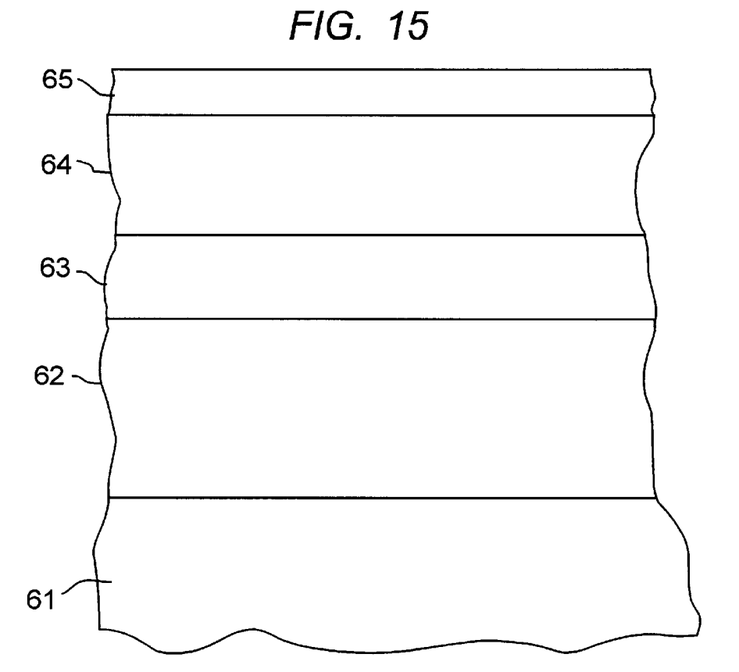
Figure 16:
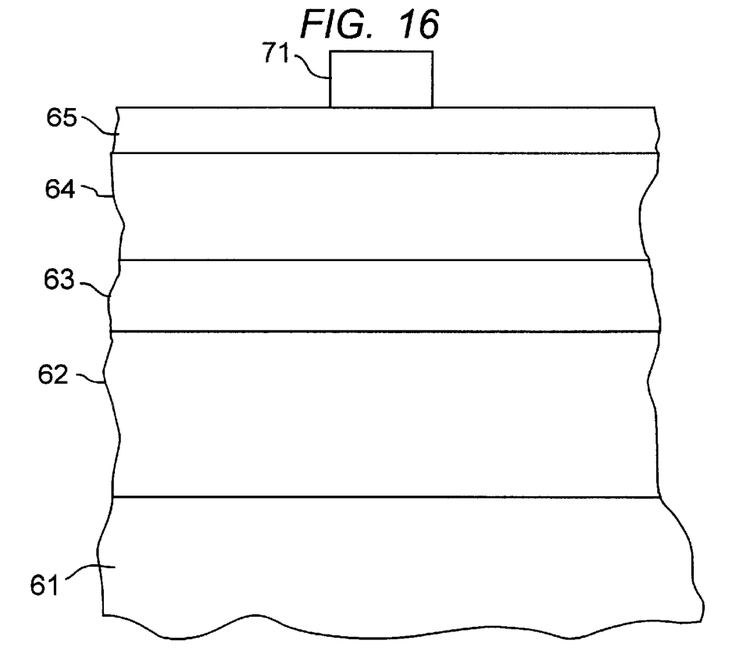
Figure 17:
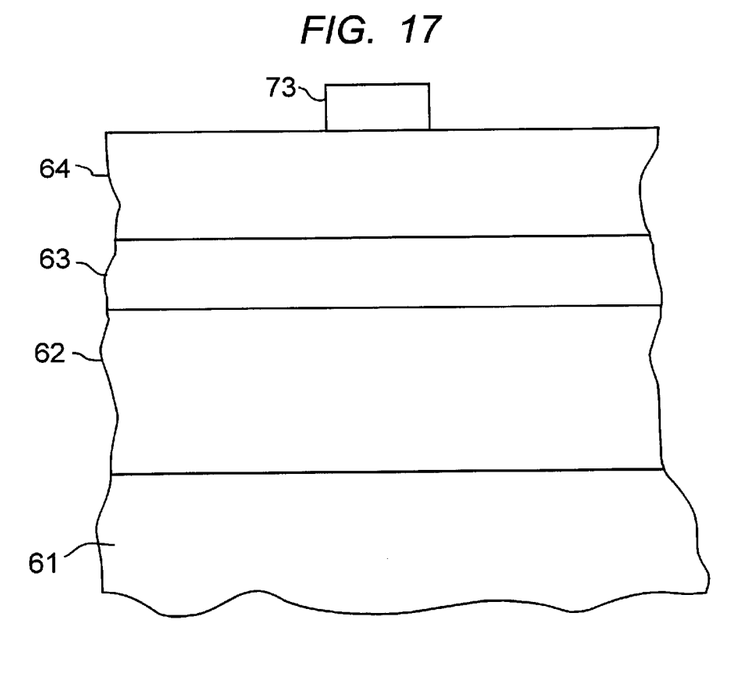
Figure 18:
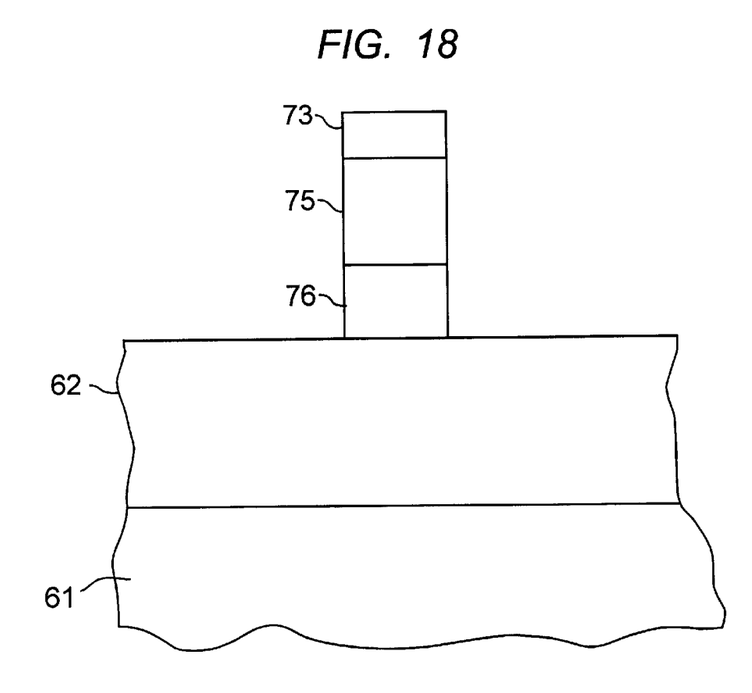

An alternative technique for fabricating the thermo-optic control means used in the PLC devices discussed above will be described in conjunction with FIGS. 13 to 19. Many of the process features are the same as those detailed earlier and will only briefly be set forth in describing this alternative sequence. In FIG. 13, the PLC substrate is shown at 61, with lower cladding layer 62 and core layer 63. This stage in the sequence is essentially that shown in FIG. 4 of the earlier embodiment. In that embodiment the waveguide core layer was patterned to form the waveguide core prior to depositing the second cladding material. In the approach to be described now, a multilayer stack is formed including the first and second cladding layers, the core layer and the heater strip layer. FIG. 14 shows the second cladding layer 64 formed over the core layer 63. The metal heater strip layer 65 is deposited as shown in FIG. 15. This multilayer stack can be produced in a single processing tool, e.g. a CVD apparatus or a cluster tool, without any intervening processing. The metal heater strip layer 65 is masked with mask 71, as shown in FIG. 16, and the heater strip 73 defined as shown in FIG. 17. Using the heater strip feature as an etch mask, as in the earlier embodiment, the remaining multilayer stack is etched down to the first cladding layer. An etch stop layer, as well known in the art, can be employed between the first cladding layer and the core layer for etch control. The resulting structure, shown in FIG. 18, has waveguide core 76 and heater strip 73 precisely self-aligned Sidewall cladding for waveguide core 76 is provided by depositing sidewall cladding layer 77 over the etched stack as shown in FIG. 19.

In addition to the simplified processing afforded by this embodiment, it also allows selective tailoring of the thermal properties of the heat channel 75. The thermal inertia between heating strip 73 and waveguide core 76 can be reduced by using an efficient heat transfer material for layer 64 (FIG. 17).

Another option for improving the efficiency of the coupling device shown in FIG. 12 is to use a cladding material for the space between waveguides in the coupler section which has a refractive index that is relatively more sensitive to temperature changes than conventional waveguide materials. Conventional cladding materials are $SiO_2$, or a doped silica, with a temperature dependence of refractive index, $d\eta/dT$, of the order of $+10^{-5}/°$ C. Polymer cladding materials are available with $d\eta/dT$ that is consistently in the range $-0.5\times10^{-4}/°$ C. to $-4\times10^{-4}/°$ C. Consequently, a much larger change in the effective index is possible for the same change in temperature.

Figure 19:
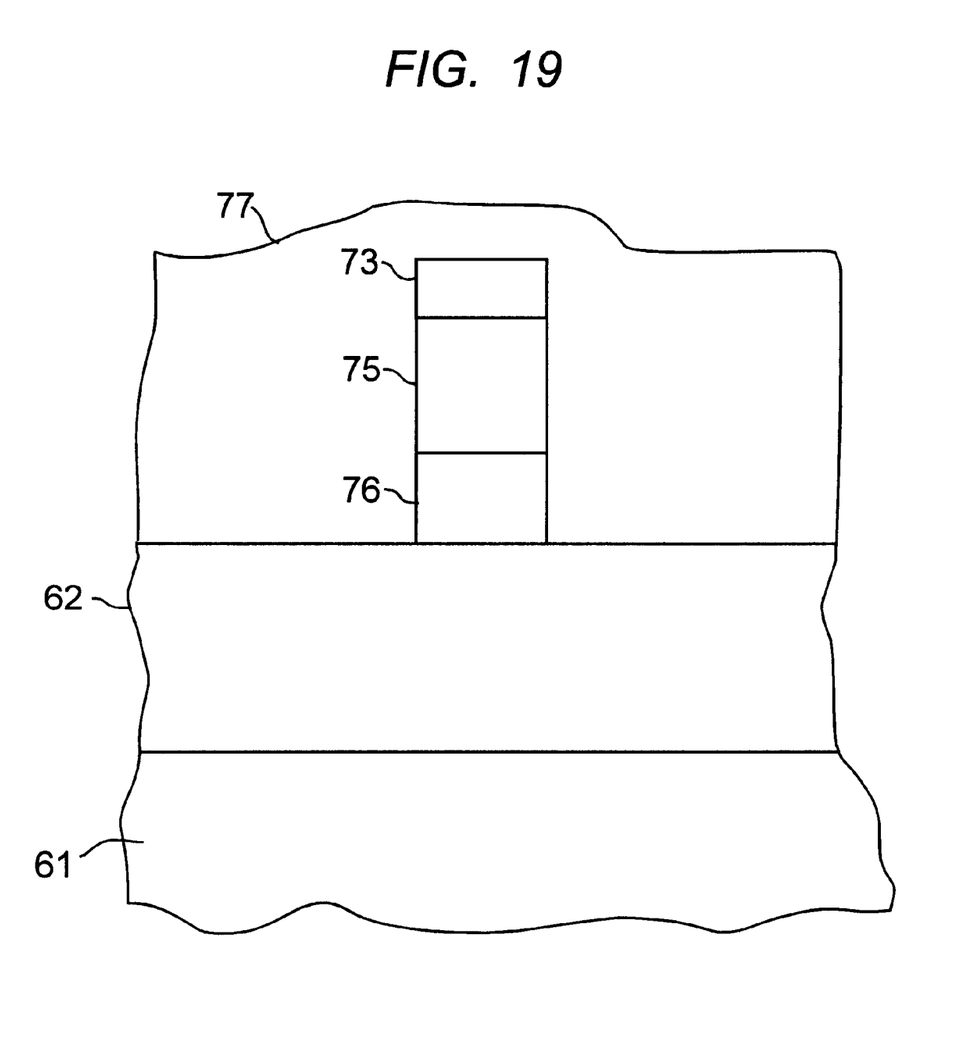

This expedient may be implemented using a polymer cladding material for layer 77 in FIG. 19. A prepolymer may be applied by spinning, by syringe, or by suitable technique, and then curing to produce the polymer cladding material 77 that separates waveguide core 76 from an adjacent waveguide core, not shown. A wide variety of polymers are useful as the localized cladding material. Desired properties of the polymer include: low loss at wavelengths of interest (1.3–1.6 μm), adherent, thermally stable, hydrolytically stable, crack resistant, and an index in the range 1.3–1.6 μm. Preferred polymers are fluorinated polymers and silicon-based polymers (siloxanes).

This approach, combined with that described earlier, allows the cladding material for the coupling region to be optimized for thermo-optic response, while the cladding material between the heater strip and the waveguide core can be optimized for efficient heat transfer.

The waveguide structures in the devices described herein are conventional waveguides with a strip-like configuration and typically rectangular, or preferably essentially square, in cross section.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. An optical device comprising:
   a. a substrate,
   b. a lower cladding layer on the substrate,
   c. an optical waveguide core formed on said lower cladding layer for guiding a lightwave in a path parallel to said lower cladding layer, said optical waveguide core having a width $W_2$ measured normal to said path,
   d. an upper cladding layer covering said optical waveguide core,
   e. a heater strip on said upper cladding layer overlying said optical waveguide core with the center of the heater strip centered over said waveguide core for heating said waveguide core, said heater strip and said upper cladding layer having a width $W_1$ measured normal to said path, where $W_1$ is 1.5 to 7 $W_2$.

2. The optical device of claim 1 wherein the upper and lower cladding layers comprise $SiO_2$.

3. The optical device of claim 2 wherein the waveguide comprises doped $SiO_2$.

4. An optical device comprising:
   a. a substrate,
   b. a lower cladding layer on the substrate,
   c. a optical waveguide core formed on said lower cladding layer for guiding a lightwave in a path parallel to said lower cladding layer, said optical waveguide core having an essentially square or rectangular cross section with a top surface and side surfaces, and having a width $W_2$ measured between said side surfaces,
   d. a first upper cladding layer covering said top of said optical waveguide core,
   e. a heater strip on said upper cladding layer overlying said optical waveguide core for heating said waveguide core, said the heater strip being centered over said waveguide core, said heater strip and said first upper cladding layer having a width $W_1$ measured normal to said path, where $W_1$ is essentially equal to $W_2$, and
   f. a second upper cladding layer covering said side surfaces of said waveguide core.

5. The device of claim 4 wherein said first upper cladding layer and said second upper cladding layer are of different materials.

6. The device of claim 5 wherein said first upper cladding layer has higher heat conductivity than said lower cladding layer.

7. The device of claim 5 wherein said second upper cladding layer is a polymer having a dependence of refractive index with temperature $d\eta/dT$ in the range $-0.3\times10^{-4}/°$ C. to $-5\times10^{-4}/°$ C.

8. The optical device of claim 1 in which the substrate is silicon.

9. A method for the manufacture of an optical device comprising the steps of:
   a. depositing a first cladding layer on a substrate,
   b. depositing a waveguide core layer on said first cladding layer,
   c. applying a first lithographic mask on said waveguide core layer,
   d. patterning said first lithographic mask with actinic radiation to leave portions of said waveguide core layer exposed,
   e. etching away the exposed portions of said waveguide core layer leaving at least one waveguide core on said first cladding layer, said waveguide core having a width $W_2$,
   f. depositing a second cladding layer to cover said waveguide core and the exposed portions of said first cladding layer,
   g. depositing a thermoelectric layer to cover said second cladding layer,
   h. forming a second lithographic mask on said thermoelectric layer to leave portions of said thermoelectric layer exposed, said second lithographic mask having a width $W_2$, where $W_2$ is greater than $W_1$,
   i. etching the exposed portions of said thermoelectric layer to form a heater strip thereby exposing portions of said second cladding layer, and
   j. using said heater strip as an etch mask, etching said exposed portion of said second cladding layer down to said first cladding layer.

10. The method of claim 9 where $W_1$ is 1.5–7 $W_2$.

11. The method of claim 10 wherein the upper and lower cladding layers comprise $SiO_2$.

12. The method of claim 11 wherein the waveguide core comprises doped $SiO_2$.

13. A method for the manufacture of an optical device comprising the steps of:
   a. depositing a first cladding layer on a substrate,
   b. depositing a waveguide core layer on said first cladding layer,
   c. depositing a second cladding layer on said waveguide core layer,
   d. depositing a thermoelectric layer on said second cladding layer,
   e. forming a lithographic mask on said thermoelectric layer to leave portions of said thermoelectric layer exposed, f. etching the exposed portions of said thermoelectric layer to form a heater strip thereby exposing portions of said second cladding layer, g. using said heater strip as an etch mask, etching said second cladding layer and said waveguide core layer down to said first cladding layer to form a stack comprising a waveguide core, a cladding on said waveguide core and said heater strip, and h. depositing a third cladding layer over the stack formed in step g.

14. The method of claim 13 wherein the material of said second cladding layer is different from the material of said third cladding layer.

15. The method of claim 14 wherein the material of said third cladding layer has a dependence of refractive index on temperature $d\eta/dT$ of Y, where $Y \geqq 5X$.

16. The method of claim 15 wherein two spaced apart waveguide cores are formed on said first cladding layer, with a portion of each of said at least two spaced apart waveguide cores lying parallel and closely spaced to one another to define a coupling region therebetween, and the third cladding layer covers said coupling region.

17. The method of claim 16 wherein the material deposited in the coupling region is a polymer.

\* \* \* \* \*